March 3, 1959 P. A. LANG 2,876,389

CHASSIS MOUNTING MECHANISM

Filed Jan. 16, 1956 3 Sheets-Sheet 1

INVENTOR.
PAUL A. LANG
BY Val R. Gosham
ATTORNEY

March 3, 1959 P. A. LANG 2,876,389

CHASSIS MOUNTING MECHANISM

Filed Jan. 16, 1956 3 Sheets-Sheet 2

INVENTOR.
PAUL A. LANG

BY Val R. Gosham

ATTORNEY

CHASSIS MOUNTING MECHANISM

Filed Jan. 16, 1956 3 Sheets-Sheet 3

INVENTOR.
PAUL A. LANG
BY [signature]
ATTORNEY

United States Patent Office 2,876,389

Patented Mar. 3, 1959

2,876,389

CHASSIS MOUNTING MECHANISM

Paul A. Lang, Hollywood, Calif., assignor, by mesne assignments, to the United States of America as represented by the Secretary of the Air Force

Application January 16, 1956, Serial No. 559,239

4 Claims. (Cl. 317—99)

This invention relates to mountings for equipment units such as electrical oscillators, amplifiers, and the like, and is particularly suited to provide rapid inspection of the units in operating positions and rapid removal of the units from their panels or racks and their replacement therein.

As disclosed in Singer patent, No. 2,486,764, of November 1, 1949, many electrical equipment units are mounted on vertical panels or racks and interconnected through multiple pin plugs with other similarly mounted units. A plurality of units may be mounted on one rack and a plurality of racks placed side by side in a single installation.

The present mounting assembly has several advantages over prior constructions in that it permits the mounting of both light and heavy electrical units with equal facility, permits the easy rotation of any unit to inspection position, permits the easy removal of the unit to a repair bench and the replacement of the unit in its panel, and provides a lock for the unit in both its operating and inspection positions. The mounting is of the drawer type similar to the unit shown in the aobve-mentioned Singer patent so that the front panels of all units may be vertically aligned in their racks.

The principal object of the invention, therefore, is to facilitate the mounting, dismounting, inspection, and repair of equipment units of the electrical type.

Another object of the invention is to provide an improved mounting construction or assembly for electrical units.

A further object of the invention is to provide an improved mounting construction which permits the rapid inspection and removal of the unit from its mounting panel regardless of the size and weight of the unit.

The novel features which are believed to be characteristic of this invention, both as to the manner of its organization and the mode of its operation, will be better understood from the following description when read in conjunction with the accompanying drawings, in which.

Figures 1, 3:
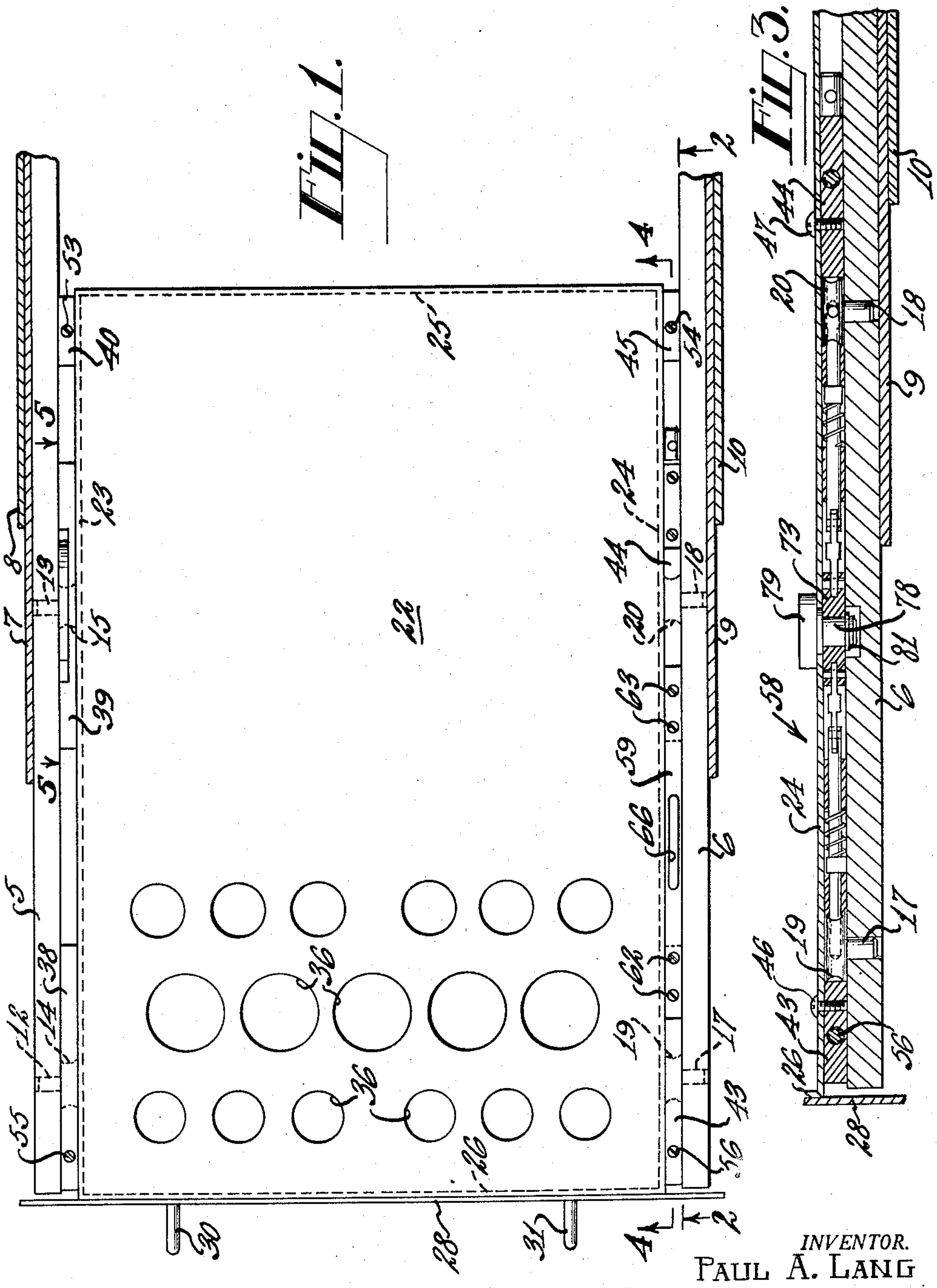
Fig. 1 is a plan view of a unit assembly embodying the invention.
Fig. 3 is a cross-sectional view of the assembly taken along the line 3—3 of Fig. 2.

Referring, now, to the drawings in which the same reference numerals identify like elements, there is shown a pair of runners 5 and 6 which are mounted in any suitable manner for sliding horizontally in and out of a vertical rack or panel to which are attached slidable rails 7, 8, 9, and 10. Pressed in runner 5 are stub shafts 12 and 13 having grooved circular chassis supporting collars 14 and 15, respectively. Pressed in runner 6 are stub shafts 17 and 18 having circular chassis supporting collars 19 and 20, respectively.

The chassis itself is a rectangular box-like frame having an upper platform 22, side walls 23 and 24, a rear end wall 25 and a front end wall 26, to which a front plate 28 is attached in any suitable manner. Handles 30 and 31 on the plate 28 aid in rotating the chassis and removing it from its runners 5 and 6. Three electrical components, which may be condensers and tubes 32, 33, and 34, are mounted on the platform 22, other required components for a certain assembly being similarly mounted with the wiring on the opposite side of the platform. Fig. 1 shows a plurality of holes 36 in which the components may be mounted.

Figure 4:
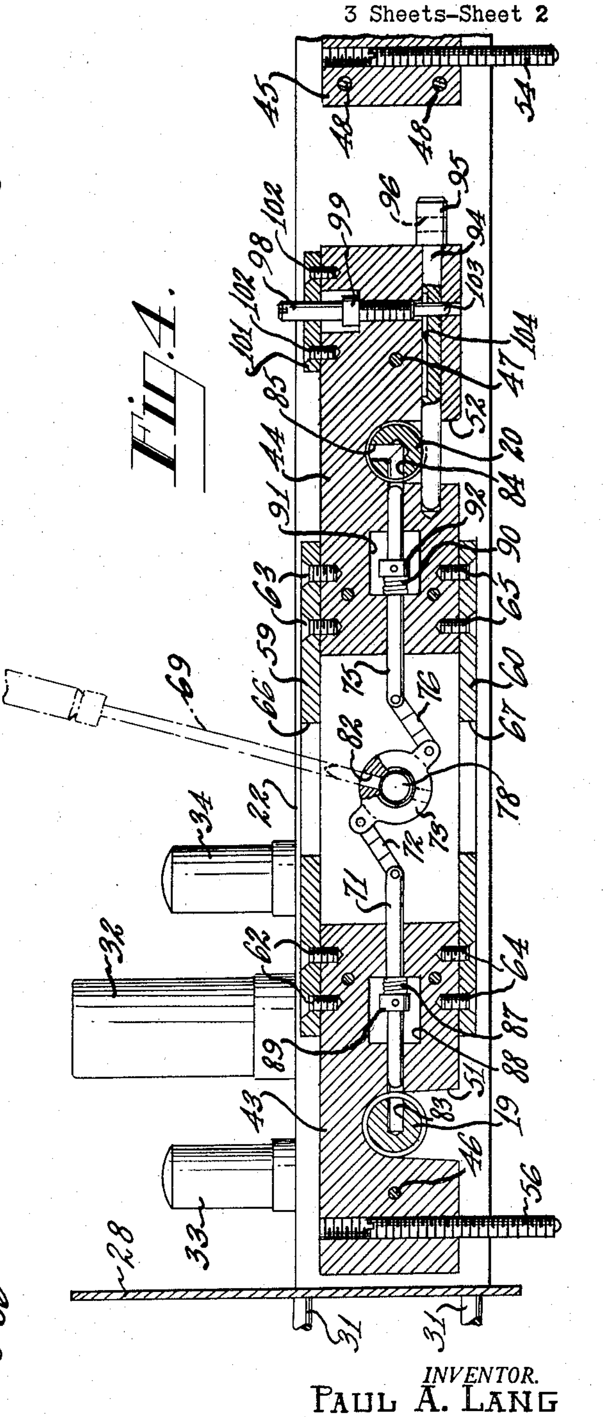
Fig. 4 is a side elevational view partially in cross-section and taken along the line 4—4 of Fig. 1.
Figure 9:
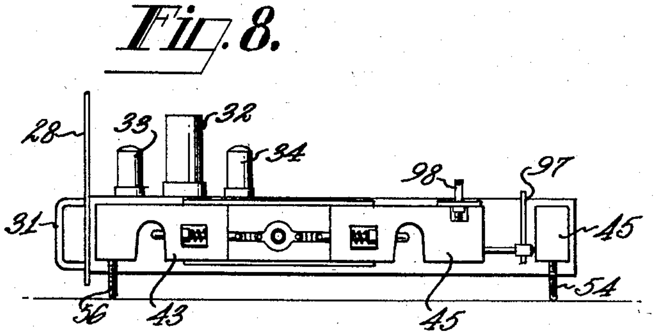
Fig. 9 is a view showing the electrical unit positioned on a repair bench.

To the side wall 23 are attached three blocks 38, 39, and 40 in any suitable manner, as by screws 42 (see Fig. 5), and to the side wall 24 are attached three blocks 43, 44, and 45 in any suitable manner, as by screws 46, 47, and 48 (see Fig. 4). In the lower edges of blocks 38, 39, 43, and 44 are notches. Two such notches 51 and 52 are shown in blocks 43 and 44, respectively. These notches are slightly tapered to facilitate the entrance of the respective collars therein. The blocks 40 and 45 have screws 53 and 54 threaded therein to provide supporting legs for the rear end of the unit. Similar screws 55 and 56 in blocks 38 and 43, respectively, provide the front legs of the unit. These legs are used when the unit is placed on a repair bench, as shown in Fig. 9.

The locking and unlocking mechanism for the unit will now be described, this unit 58 being provided on only one side of the chassis. The two blocks 43 and 44 are interconnected by strips 59 and 60, the strip 59 being attached to the blocks by screws 62 and 63, and the strip 60 being attached to the respective blocks by screws 64 and 65. These blocks have respective slots 66 and 67 therein, the upper slot (Fig. 4) accommodating a tool, such as a screwdriver, shown in broken lines 69.

In a hole in block 43 is positioned a rod 71 which, through a linkage 72, is attached to one ear of a yoke 73. In a hole in the block 44 is a similar rod 75 attached by a link 76 to a diametrically opposite ear on the yoke 73. The yoke 73 is rotatable upon a stub shaft 78 pressed into the wall 24 of the chassis and having a collar 79 (see Fig. 3), the shaft holding the yoke in position by a washer 81. The yoke has a radial hole or slot 82 therein to accommodate the end of a tool, such as the screwdriver 69.

The collar 19 has a radial hole 83 drilled therein, while the collar 20 has two radial holes 84 and 85 at right angles to one another. The free end of the rod 71 is adapted to be inserted in the hole 83 of the collar 19, and the free end of the rod 75 is adapted to be inserted in the hole 84 of the collar 20 when the yoke 73 is rotated to the position shown in Figs. 2 and 9.

To insure that the free ends of the rods 71 and 75 will remain in their respective holes 83 and 84, the rods are spring biased to these positions. The rod 71 is biased by a coil spring 87 positioned between the side of an opening 88 in the block 43 and a collar 89 pinned to the rod 71. The rod 75 is biased by a coil spring 90 between a side of an opening 91 in the block 44 and a collar 92 pinned to the rod 75. Thus, upon the removal of the tool 69, the free ends of the rods 71 and 75 will automatically be inserted into their respective holes 83 and 84. This insures the locking of the chassis to the runner 6 to maintain it in operating position.

Figure 2:
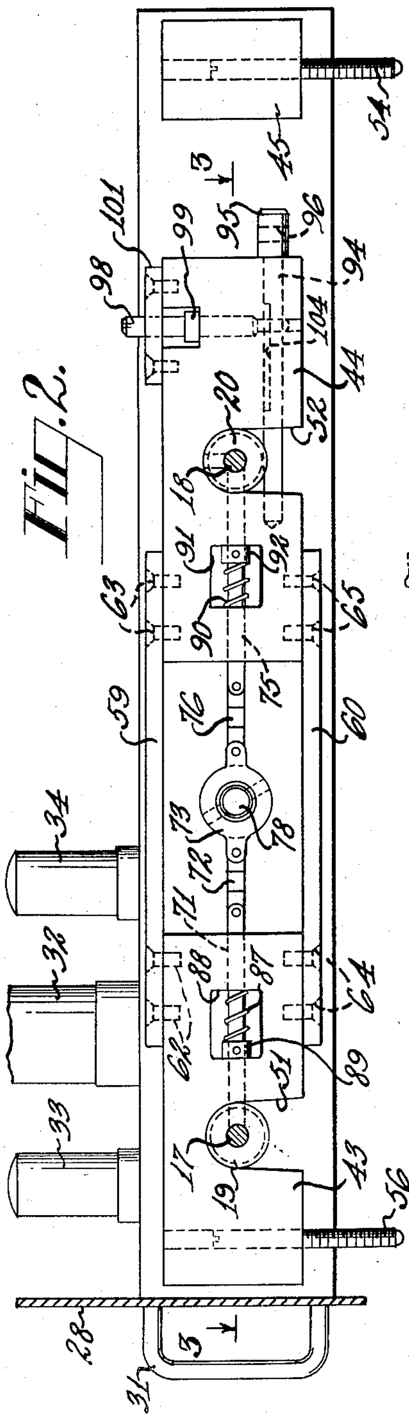
Fig. 2 is an elevational view of an assembly embodying the invention taken along the line 2—2 of Fig. 1.
Figures 5, 6, 7, 8:
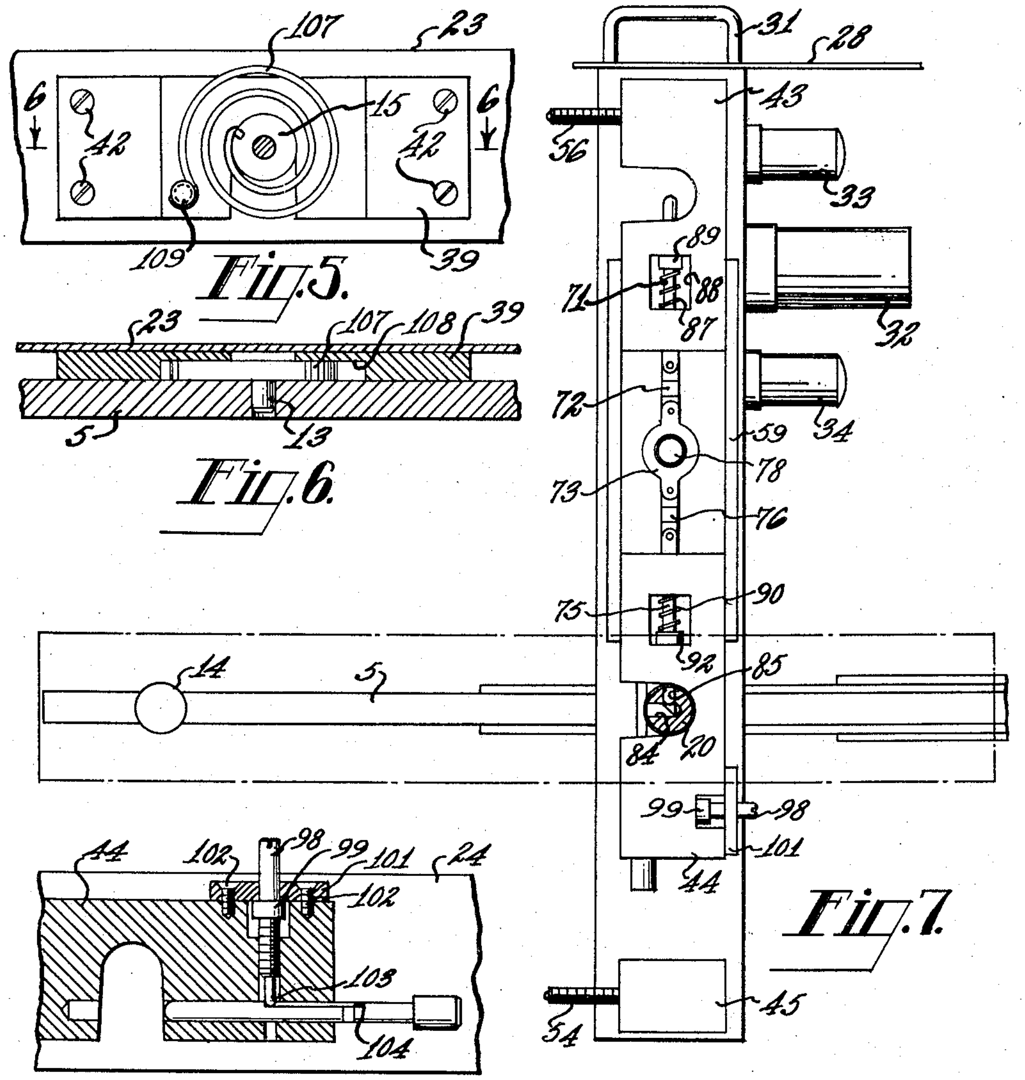
Fig. 5 is a detail view of the lift spring taken along the line 5—5 of Fig. 1.
Fig. 6 is a cross-sectional view taken along the line 6—6 of Fig. 5.
Fig. 7 is a view of the assembly rotated to inspection position.
Fig. 8 is a detail view of the pivot locking mechanism in unlocked position.

As mentioned above, the unit is rapidly rotatable to the position shown in Fig. 7 for inspection of the components under the platform 22. To insure holding the electrical unit on its supporting collars 15 and 20 in both its operating and inspection positions, the collar 20 is locked to the block 44 by a pin 94 positionable in openings in the block 44 spanning the notch 52, as shown in Figs. 2 and 4. The rod 94 has a knob 95 at one end thereof in which is a hole 96 for reception of a tool, such as the end of a screwdriver 97 shown in Fig. 9. The tool is used for moving the rod 94 axially when a locking screw 98, threaded in the block 44, has been turned upwardly so that its stop collar 99 is in contact with a plate 101 fastened to the block 44 by screws 102 (see Fig. 8). When the screw 98 is in the position just described, its end 103 is removed from a hole in the pin 94 so that the pin 94 may be moved axially to the right. A notch 104 accommodates the tip of the end 103 to maintain the rod 94 in a fixed rotatable position during the axial movement of the rod. When the rod 94 is in the position shown in Figs. 2 and 4, it fits in the groove of the collar 20 and locks the rear end of the assembly in position during the 90 degree rotation thereof from the horizontal position of Figs. 2 and 4 to the vertical position shown in Fig. 7. Now, when the unit has reached the position shown in Fig. 7, the tool 69 is removed from the yoke 73 and the end of the rod 75 enters the hole 85 of the collar 20, and the unit is locked in its position shown in Fig. 7. There is thus no danger of the unit falling or returning to its horizontal position while being inspected and worked upon.

Since many of the electrical units are heavy, the rotation of the unit by handles 30 and 31 is aided by a spiral spring 107 (see Fig. 5), which is mounted in a recess 108 of the block 39 attached to the wall 23 of the chassis by the screws 42. One end of the spring 107 is attached to the block 39 by a pin 109, and the other end of the spring is locked in a hole in the collar 15 after the desired amount of tension has been placed in the spring. The tension is in a direction to aid in rotating the front end of the chassis on collars 15 and 20 from the position shown in Fig. 4 to the position shown in Fig. 7. The spring also stabilizes the rotation of the chassis back again to its operative position.

The above assembly, therefore, provides a mounting structure for an electrical unit positioned in a panel or rack which is rotatably movable to an inspection and repair position while providing a holding lock in both its operating and inspection positions. Since the chassis components are mounted on both sides of the rotatable axis of the chassis and rotation is aided by a spring, heavy electrical units may be handled with the same ease as small units. Furthermore, the units may be quickly detached from the rack by movement of the pin 94 and moved to a bench for extensive repairs when necessary, as shown in Fig. 9. The unit is just as easily attachable to its mounting structure.

I claim:

1. A mounting rack construction for an electrical chassis comprising runners adapted to be moved longitudinally, a chassis frame unit, slotted members attached to said chassis frame unit, grooved collar members attached to said runners, said collar members being accommodated in the slots of said slotted members, a pair of said collar members on one of said runners having openings therein, said frame unit being adapted to be rotated on two of said collar members in axial alignment, axially aligned and movable rods in said slotted members adapted to be inserted in said openings when moved away from one another, a rotatable yoke attached to the ends of said rods positioned the closest to one another, rotation of said yoke member in one direction moving said rods toward one another for removing the ends of said rods from said collar members, and an axially movable pin in one of said slotted members for engaging the groove of and locking said slotted member to one of said pair of collar members on which said frame unit is rotatable.

2. A mounting rack in accordance with claim 1 in which a second pin is provided in said one slotted member for locking said first-mentioned pin in a locking position.

3. A mounting rack for an electrical chassis comprising slidable runners, a chassis frame adapted to be supported between and on said runners and having one end rotatable on said runners, a grooved collar attached to said runners adjacent the ends of each runner, notched members attached to the sides of and adjacent the corners of said frame, said collars being accommodated in the notches of said notched members, said frame being rotatable on a pair of said collars in axial alignment, and means for locking a pair of said notched members on one side of said frame to said collars in the notches of said last-mentioned pair of notched members when said chassis frame is in a certain position, said locking means including a rotatable yoke between said last-mentioned pair of notched members, and axially aligned rods in said last-mentioned pair of notched members having their nearest positioned end attached to said yoke for axial movement thereof upon rotation of said yoke, said collars in said last-mentioned pair of notched members having radial openings therein to accommodate the free end of each of said rods when said rods are in one axial position and said chassis frame is in said certain position, a pin being provided in one of said last-mentioned pair of said notched members and in a portion of the groove in said collar having said second radial opening therein for locking said one notched member on said collar in said one notched member.

4. A mounting rack in accordance with claim 3 in which a lock pin is provided in said one notched member for locking said first-mentioned pin in its locking position.

References Cited in the file of this patent

UNITED STATES PATENTS

| | | |
|---|---|---|
| 878,206 | Johnson | Feb. 4, 1908 |
| 964,844 | Broughton | July 19, 1910 |
| 1,964,114 | Gerlack | June 26, 1934 |
| 2,648,585 | Straubel | Aug. 11, 1953 |
| 2,655,422 | Gussack | Oct. 13, 1953 |
| 2,700,944 | Pauley | Feb. 1, 1955 |
| 2,749,200 | Kuss | June 5, 1956 |
| 2,788,253 | Gussack | Apr. 9, 1957 |